United States Patent Office 2,813,901
Patented Nov. 19, 1957

2,813,901

RECOVERY OF β,β'-OXYDIPROPIONIC ACID

Keith M. Taylor, La Marque, Tex., assignor to Monsanto Chemical Company, St. Louis, Mo., a corporation of Delaware No Drawing. Application December 27, 1955,
Serial No. 555,243

4 Claims. (Cl. 260—535)

This invention relates to β,β'-oxydipropionic acid and more specifically to its recovery from aqueous solutions thereof.

β,β'-Oxydipropionic acid is conveniently prepared by the acidic hydrolysis of β,β'-oxydipropionitrile. The reaction is conveniently carried out by bubbling HCl through an aqueous solution of β,β'-oxydipropionitrile. The reaction mixture thus obtained is an aqueous solution of β,β'-oxydipropionic acid. Recovery of this acid by methods heretofore used has proven to be most difficult.

It is an object of this invention to provide an improved process for the recovery of β,β'-oxydipropionic acid from aqueous solutions thereof. Other objects will become apparent from the description of the invention.

It has now been discovered that β,β'-oxydipropionic acid can be recovered from aqueous solutions in excellent yield by extracting the β,β'-oxydipropionic acid with dichloromethane. The following examples will illustrate the invention.

*Example I*

To a flask equipped with a reflux condenser, stirrer and hydrogen chloride inlet tube was added 124 g. β,β'-oxydipropionitrile and 144 g. water. Anhydrous HCl was bubbled into the mixture while maintaining the temperature in the range from 70° C. to 80° C. The reaction was continued for approximately 16 hours and the reaction mixture then contained 124 g. of β,β'-oxydipropionic acid. The reaction mixture was filtered to remove ammonium chloride and then transferred to a suitable apparatus to permit the liquid extraction of β,β'-oxydipropionic acid using dichloromethane. In this apparatus vaporized dichloromethane was led into a tube containing the aqueous solution of β,β'-oxydipropionic acid at a point above the solution. The dichloromethane vapors were condensed and allowed to fall into the solution. Being heavier than water, the condensed dichloromethane passed through the aqueous solution of β,β'-oxydipropionic acid and was removed and returned to the flask wherein the dichloromethane vapors were generated. This continuous extraction was continued for approximately 72 hours. Extraction temperature was approximately 30° C.

After the extraction was stopped dichloromethane was distilled from the mixture of dichloromethane and β,β'-oxydipropionic acid and 106.8 g. of β,β'-oxydipropionic acid recovered, representing an 86.5% yield based upon β,β'-oxydipropionic acid in the reaction mixture prior to extraction. The β,β'-oxydipropionic acid was purified by recrystallization from an ether-petroleum ether mixture. A white crystalline product assaying approximately 94% was obtained.

*Example II*

An aqueous reaction mixture containing 145 g. of β,β'-oxydipropionic acid was prepared in accordance with the procedure described in Example I. The reaction mixture was filtered to remove ammonium chloride and then transferred to the extraction apparatus described in Example I. In this case chloroform was used as the extracting agent and the extraction was carried out for approximately 168 hours. Extraction temperature was approximately 30° C.

After the extraction was stopped chloroform was distilled from the mixture of chloroform and β,β'-oxydipropionic acid therefrom and 90.8 g. of β,β'-oxydipropionic acid recovered, representing a 62.5% yield based upon β,β'-oxydipropionic acid in the reaction mixture prior to extraction. The β,β'-oxydipropionic acid was purified by recrystallization from an ether-petroleum ether mixture. A white crystalline product assaying approximately 94% was obtained.

A comparison of the results obtained in the examples set forth above clearly indicates the outstanding utility of dichloromethane for the purposes of extracting β,β'-oxydipropionic acid from aqueous solutions thereof. The use of dichloromethane as the extracting agent resulted in obtaining a much higher yield of β,β'-oxydipropionic acid in a much shorter period of time than obtained when using chloroform even though chloroform is also a good solvent for β,β'-oxydipropionic acid.

For the purposes of this invention, aqueous solutions of β,β'-oxydipropionic acid can be obtained by any method well known to those skilled in the art. Such reaction mixtures are conveniently obtained by the acidic hydrolysis of β,β'-oxydipropionitrile. This is best carried out by bubbling HCl through an aqueous solution of β,β'-oxydipropionitrile containing at least 4 molecular proportions of water, and preferably 8 or more molecular proportions of water, for each molecular proportion of β,β'-oxydipropionitrile. The hydrolysis reaction can be carried out over a wide temperature range as, for example, from about 0° C. to about 100° C. Preferably the reaction is carried out at a temperature in the range of 65° C. to about 85° C.

In the broadest aspect of this invention any mineral acid can be used in the hydrolysis reaction. Best results are obtained by using hydrochloric acid. At least two equivalent proportions of the acid should be used for each proportion of the β,β'-oxydipropionitrile. The acid can be used in excess if desired.

Extraction of β,β'-oxydipropionic acid from aqueous solutions thereof with dichloromethane can be accomplished in any convenient manner using methods and apparatus well known to those skilled in the art. The extraction may be carried out over a wide temperature range varying from about 0° C. to the boiling point of dichloromethane at the particular pressure used. Excellent results are obtained when the extraction is carried out at approximately atmospheric pressure at a temperature in the range of about 20° C. to about 40° C.

After extraction, β,β'-oxydipropionic acid can be recovered from the dichloromethane by any convenient method. Dichloromethane can be simply flashed off. Generally, further purification of the β,β'-oxydipropionic acid is unnecessary for most applications.

What is claimed is:

1. In a process for the recovery of β,β'-oxydipropionic acid from aqueous solutions thereof the improvement which comprises extracting β,β'-oxydipropionic acid from said solution with dichloromethane.

2. In a process for the recovery of β,β'-oxydipropionic acid from aqueous solutions thereof the improvement which comprises extracting β,β'-oxydipropionic acid from said solution with dichloromethane at a temperature in the range from about 20° C. to about 40° C.

3. In a process for the recovery of β,β'-oxydipropionic acid from an aqueous solution thereof obtained by passing hydrogen chloride into a water solution of β,β'-oxydipropionitrile, the improvement which comprises extracting the β,β'-oxydipropionic acid from said aqueous solution with dichloromethane.

4. In a process for the recovery of β,β'-oxydipropionic acid from an aqueous solution thereof obtained by passing hydrogen chloride into a water solution of β,β'-oxydipropionitrile, the improvement which comprises extracting the β,β'-oxydipropionic acid from said aqueous solution with dichloromethane at a temperature in the range of from about 20° C. to about 40° C.

References Cited in the file of this patent

UNITED STATES PATENTS 2,466,419     Hagemeyer _____ Apr. 5, 1949

OTHER REFERENCES

Jordan: Technology of Solvents, 1932, page 214.
Christian et al.: JACS, vol. 70, 1949, pp. 1333–6.